D. T. KENNEY.
MEANS FOR OBSERVING DUST LADEN CURRENTS OF AIR.
APPLICATION FILED JUNE 1, 1905.
907,694.
Patented Dec. 22, 1908.
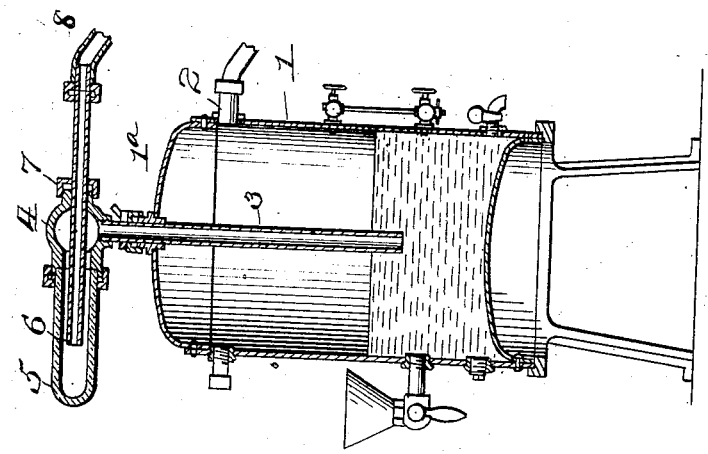
Witnesses
Charles F. Bishop
George H. Gilman
Inventor
David T. Kenney
By Thomas Ewing, Jr.,
Attorney

UNITED STATES PATENT OFFICE.

DAVID T. KENNEY, OF NORTH PLAINFIELD, NEW JERSEY, ASSIGNOR TO VACUUM CLEANER COMPANY, OF NORTH PLAINFIELD, NEW JERSEY, A CORPORATION OF NEW JERSEY.

MEANS FOR OBSERVING DUST-LADEN CURRENTS OF AIR.

No. 907,694.  Specification of Letters Patent.  Patented Dec. 22, 1908.

Original application filed November 29, 1901, Serial No. 84,058. Divided and this application filed June 1, 1905. Serial No. 263,344.

*To all whom it may concern:*

Be it known that I, DAVID T. KENNEY, a citizen of the United States, residing in the borough of North Plainfield, county of Somerset, and State of New Jersey, have invented new and useful Improvements in Means for Observing Dust-Laden Currents of Air, of which the following is a specification.

In the cleaning of carpets, upholstery, and other articles by means of what is commercially known as the "vacuum cleaning system," in which system the dirt and dust carried by the article to be cleaned is drawn therefrom by means of a suction produced within the cleaning implement, it is desirable to provide means for ascertaining whether dust or dirt is being withdrawn from the article by the apparatus, in order that the operation may be continued as long as dust is being removed by means of the air current, and in order that the operation may be discontinued when dust ceases to be withdrawn. In my prior application, filed November 29, 1901, serially numbered 84,058, which has since the filing of this application, namely, on March 19, 1907, issued as Patent No. 847,947, I have shown an apparatus for use in such a system, and in the said application show in connection therewith an observation chamber having transparent walls, through which the dust-laden air is caused to pass on its way from the hand-tool to the vacuum pump, whereby the amount of dust carried by the air can be observed. In this application, which is filed as a division and as a continuation of the said prior application, I claim the means therein shown for so observing the character of the air current.

Referring to the accompanying drawings, in which corresponding parts are designated by corresponding marks of references: the figure is a sectional view of a wet separator, having the observation chamber forming the subject matter of this application attached thereto.

In these drawings, 1 represents a suitable vessel partly filled with water, forming what is known as a wet separator, from which leads a suction pipe 2. This pipe can be connected to some suitable means of producing a vacuum, such for instance as a pump. Extending through the top 1ª of the vessel is the vertical pipe 3, the lower end of which projects below the level of the water in the separator vessel. The dust or dirt is carried through this pipe directly into the liquid and is precipitated therein. The upper end of pipe 3 carries a head 4. This head carries on one side a tubular glass 5, closed at one end, and into the glass projects, through the opposite side of the head, the tube 6, the tube being capable of sliding within the head owing to the packing box 7 carried by the latter. The tube 6 is connected by means of a pipe 8 with a hand-implement, such as is described in the aforesaid original application, of which this is a division, and which is adapted to be passed over the surface to which it is applied for cleaning.

With the construction of the parts shown, it will be seen that when air is exhausted from the upper part of the separator vessel 1, a vacuum is created in the tube 6, and that in consequence thereof, air is drawn through the hand-implement removing the dirt and dust from the article to be cleaned and depositing it in the separator vessel 1. This dust-laden air, flowing through the pipe 8 and tube 6 is discharged into the observation chamber within the glass cup 5, and flows therefrom down the pipe 3 and up through the water, where it is purified. In the observation chamber the air current is deflected, when leaving the tube 6, by the closed end of the chamber, and this results in rendering more visible the dust contained therein. The chamber thus serves as an efficient means for determining whether or not the air drawn in through the hand-implement is removing dust from the article to be cleaned. There is no precipitation, deposit or accumulation of dust in the chamber because of the strong air current which reaches every part thereof.

Having thus described my invention, what I claim as new and desire to secure by Letters Patent is:

1. In combination with a passage for a current of dust-laden air, means in said passage for intercepting the current, such means including a transparent chamber, in which the action of the intercepted current can be observed.

2. In combination with a passage for a current of dust-laden air, means connected in said passage for changing the direction of the current, such means including a transparent receptacle, in which the action of the current in its changed direction can be observed.

3. In combination with a passage for a current of dust-laden air, means in said passage for intercepting the current and compelling it to change its direction, and a transparent chamber into which the intercepted current is admitted and from which it is discharged.

4. In combination with a passage for a current of dust-laden air, a transparent chamber projecting at an angle to the general direction of said passage, and means for compelling the current to enter said chamber and to leave said chamber and return to said passage.

5 In combination with a passage for a current of dust-laden air, a transparent chamber having a closed end, and an inlet opening within the said chamber opposite the closed end thereof and forming a part of the air passage, whereby the dust is discharged against the transparent wall of the chamber.

DAVID T. KENNEY.

Witnesses:
M. O'CONNOR,
HUGH H. SENIOR.